(12) United States Patent
Deng et al.

(10) Patent No.: US 10,471,936 B2
(45) Date of Patent: Nov. 12, 2019

(54) ADAPTER, NOZZLE STRUCTURE, ASSEMBLY CONSISTING OF THE ADAPTER AND THE NOZZLE STRUCTURE AND THE ASSEMBLING METHOD THEREOF

(71) Applicant: Taizhou Valeo Wenling Automotive Systems Co., Ltd., Shanghai (CN)

(72) Inventors: Bin Deng, Le Mesnil Saint Denis (FR); Xu Cheng, Le Mesnil Saint Denis (FR); Denis Grandjean, Le Mesnil Saint Denis (FR); Shilu Chen, Le Mesnil Saint Denis (FR)

(73) Assignee: Taizhou Valeo Wenling Automotive Systems Co., Ltd., Shanghai (CN)

( * ) Notice: Subject to any disclaimer, the term of this patent is extended or adjusted under 35 U.S.C. 154(b) by 316 days.

(21) Appl. No.: 15/399,911

(22) Filed: Jan. 6, 2017

(65) Prior Publication Data
US 2017/0197594 A1 Jul. 13, 2017

(30) Foreign Application Priority Data

Jan. 7, 2016 (CN) .......................... 2016 1 0008059
May 30, 2016 (CN) ..................... 2016 2 0505823 U

(51) Int. Cl.
*B60S 1/38* (2006.01)
*B60S 1/52* (2006.01)
*B60S 1/40* (2006.01)

(52) U.S. Cl.
CPC .................. *B60S 1/52* (2013.01); *B60S 1/522* (2013.01); *B60S 1/38* (2013.01); *B60S 1/40* (2013.01); *B60S 2001/3898* (2013.01)

(58) Field of Classification Search
CPC .... B60S 1/38; B60S 1/40; B60S 1/522; B60S 1/4067
See application file for complete search history.

(56) References Cited

U.S. PATENT DOCUMENTS

2007/0089257 A1* 4/2007 Harita ................... B60S 1/3801
15/250.04
2011/0185531 A1 8/2011 Egner-Walter et al.
(Continued)

FOREIGN PATENT DOCUMENTS

CN 103723129 A 4/2014
CN 104149744 A 11/2014
(Continued)

OTHER PUBLICATIONS

Search Report Issued in Corresponding Chinese Application No. 201610008059.4, dated Apr. 6, 2016 (6 Pages).

*Primary Examiner* — Michael D Jennings
(74) *Attorney, Agent, or Firm* — Osha Liang LLP

(57) ABSTRACT

The present invention discloses an assembly that can be used in windscreen wipers of vehicles and is consisting of an adapter and a nozzle structure, and also the assembling method thereof. Here the adapter presents a first adapter assembling feature (1a) and a second adapter assembling feature (1b). The nozzle structure (2) presents a first nozzle structure assembling feature (2a) and a second nozzle structure assembling feature (2b). The first adapter assembling feature and the first nozzle structure assembling feature are matched with each other to form a first connection in the form of pin-aperture between the adapter and the nozzle structure, and the nozzle structure and adapter are rotatably pre-assembled together when they are connected only be means of the first connection. The second adapter assembling feature and the second nozzle structure assembling feature are matched with each other to form a second connection in the form of snap fit between the adapter and the nozzle structure. The nozzle structure is secured to the adapter through the first connection and the second connection.

5 Claims, 13 Drawing Sheets

(56) References Cited

U.S. PATENT DOCUMENTS

| | | | | |
|---|---|---|---|---|
| 2015/0258966 A1* | 9/2015 | Thebault | ............... | B60S 1/3862 |
| | | | | 15/250.04 |
| 2015/0274127 A1* | 10/2015 | Burkard | ................ | B60S 1/3415 |
| | | | | 15/250.04 |

FOREIGN PATENT DOCUMENTS

| | | |
|---|---|---|
| CN | 104149746 A | 11/2014 |
| CN | 104943660 A | 9/2015 |

* cited by examiner

ADAPTER, NOZZLE STRUCTURE, ASSEMBLY CONSISTING OF THE ADAPTER AND THE NOZZLE STRUCTURE AND THE ASSEMBLING METHOD THEREOF

TECHNICAL FIELD

The present invention relates to the field of automobiles, and in particular relates to an adapter, a nozzle structure for windscreen wipers of vehicles, an assembly composed of the adapter and nozzle structure, that can be used in windscreen wipers of vehicles and the windscreen comprising such an assembly. The present invention also relates to the method of assembling the adapter and the nozzle structure.

BACKGROUND

Windscreen wiper is one of the important devices in vehicles, which could be located on ventilation cover panels or the front engine hood, and is used to remove rain, debris and the like from a windscreen or windshield so as to assure a good sight for the driver. Windscreen wiper plays an important role for the traffic safety.

A nozzle structure used for ejecting cleaning fluid is attached to a wiper arm of some vehicles. The proper installation of the nozzle structure directly impacts the cleaning performance and effect of the windscreen wipers. Meanwhile, it's desired that attaching/detaching the nozzle structure to/from the windscreen wiper would be easy to operate. Making the nozzle structure secured at the hook point in the center of a wiper blade is not easy to be operated, as there is no sufficient space used for the securing feature in the hook point area where there is an internal connecting structure used for connecting with the blade component.

In some existing implementations, a protrusion was stamped on the adapter of the metal arms and clasped in the recess of the nozzle structure, however, it is not easy to disassemble a connection of this type, and the paint on the adapter of a wiper arm or the nozzle may be scratched.

SUMMARY OF THE INVENTION

Taking into account the aforementioned technical problems confronted by prior art, the present invention proposes a new connection method for the nozzle structure, and by means of this new connection method, the nozzle structure can be assembled to the adapter disposed on a wiper arm via the following steps: firstly, the nozzle structure and the adapter are pre-assembled together through a connection structure of pin-aperture in particular pin-circular aperture, then the nozzle structure is rotated around said pin, the nozzle structure finally secured together with the adapter through a connection structure of snap fit when rotated to a specific position.

Compared to existing connection methods, that of the present invention has the following advantages:
  the nozzle structure can be easily assembled to the adapter (and then assembled to the wiper arm) with this connection method can be easily assembled and disassembled without the need for additional tools;
  the nozzle structure may be assembled at the center of the wiper blade making the water spray more efficient and balances the two ends of blade;
  the structures for connecting the nozzle structure and the adapter are integrated on the adapter and the nozzle structure, and no separate component is needed; the nozzle is attached directly onto the side wall of the adapter, with small size, good aerodynamic properties and beautiful style;
  it is compatible with current component manufacturing technique, without additional costs.

In the first respect, the invention proposes an adapter, for connecting and securing a nozzle structure in windscreen wipers, wherein the adapter comprising:
a side wall, to which the nozzle structure is secured;
a first adapter assemble feature, cooperatable with a corresponding feature of the nozzle structure to form a first connection in the form of pin-aperture, wherein the nozzle structure is rotatably pre-assembled to the adapter when the adapter is connected with the nozzle structure only by means of the first connection;
a second adapter assemble feature, which is in the form of a clipping slot, and which is used to receive a corresponding clipping feature of the nozzle structure, to form a second connection between the adapter and the nozzle structure in the form of snap fit;
wherein the adapter secures the nozzle structure to a side wall of the adapter by means of the first connection and the second connection.

In an embodiment, the first adapter assemble feature is a circular aperture formed in the side wall, and is provided for receiving a corresponding location pin of the nozzle structure.

In an embodiment, the clipping slot is a through hole of substantially rectangular shape, and is spaced apart from the first adapter assemble feature along the longitudinal direction of the adapter.

In an embodiment, the adapter comprises a bending structure, which is intended to be engaged into the stopping slot of the nozzle structure.

In an embodiment, the bending structure has an extension which is substantially parallel with the side wall of the adapter, and the extension is intended to be engaged into the stopping slot of the nozzle structure, such that a portion of the nozzle structure is sandwiched between the extension of the bending structure and the side wall of the adapter when the nozzle structure and the adapter are assembled together, so as to restrict the movement of the nozzle structure away from the adapter, and to prevent further rotation of nozzle structure with respect to the adapter.

In an embodiment, the adapter is located on the wiping arm of the windscreen wiper, and the wiper blade is secured to the adapter at the center of the wiper blade.

In an embodiment, the cross section of the adapter is of substantially U shape.

In the second aspect, the invention proposes a nozzle structure for a windscreen wiper, the nozzle structure is to be secured to an adapter of the windscreen wiper, wherein the nozzle structure comprising:
a body;
a nozzle, extending from the body;
a first nozzle structure assemble feature, which is located on the body and is cooperatable with a corresponding feature of the adapter to form a first connection in the form of pin-aperture, and the nozzle structure is rotatably pre-assembled to the adapter when the nozzle structure is connected to the adapter only by means of the first connection;
a second nozzle structure assemble feature, which is in the form of a clipping protrusion on the body, and which is used to engage with a corresponding feature of the adapter to form a second connection between the adapter and the nozzle structure in the form of snap fit;

wherein the nozzle structure is secured to a side wall of the adapter by means of the first connection and the second connection.

In an embodiment, the first nozzle structure assemble feature is a location pin, which is intended to be received in a corresponding circular aperture of the adapter.

In an embodiment, the clipping protrusion comprises a base, a body extending from the base, and a hook at the distal end of the body, wherein the base is connected with the body of the nozzle structure, the body is parallel with and spaced apart from the body, and the hook is intended to snap into the clipping slot of the adapter.

In an embodiment, the body is stepped in shape.

In an embodiment, a portion of the side wall of the adapter is sandwiched between the body of the nozzle structure and the body of the clipping protrusion when the clipping protrusion engages with the clipping slot.

In an embodiment, the location pin is disposed on a mounting surface of the nozzle structure which faces the adapter, and raised regions, which are higher than the mounting surface and which are intended to contact the side wall, are disposed surrounding the location pin.

In an embodiment, the raised regions comprises four strip-shaped raised regions that are disposed surrounding the location pin.

In an embodiment, a band-shaped raised region, which is also higher than the mounting surface of the nozzle structure and which faces the adapter, is disposed on the mounting surface, and the band-shaped raised region is perpendicular to the longitudinal direction of the nozzle structure and is intended to contact with the side wall.

In an embodiment, the nozzle structure is formed integrally from plastic material.

In an embodiment, a cut-out portion is disposed at the end of the nozzle structure which is adjacent to the first nozzle structure assemble feature, and a stopping slot is disposed at the cut-out portion to receive the bending structure of the adapter, such that a portion of the nozzle structure is sandwiched between the extension of the bending structure and the side wall of the adapter when the nozzle structure and the adapter is assembled together.

In an embodiment, the stopping slot opens at the cut-out surface of the cut-out portion.

In the third aspect, the invention proposes an assembly used in windscreen wipers, wherein the assembly comprising the adapter of any one of the first aspect, and the nozzle structure of any one of the second aspect.

In the fourth aspect, the invention also proposes a windscreen wiper, wherein the windscreen wiper comprising the assembly of the third aspect.

With reference to the attached drawings, a preferred embodiment according to the present invention will be illustrated in detail below in order to easily understand the aforementioned and other characteristics and advantages of the present invention.

BRIEF DESCRIPTION OF THE DRAWINGS

In the following, a specific embodiment of the assembly with adapter-nozzle structure according to the present invention will be described with reference to the drawings. In which.

DETAILED DESCRIPTION OF EMBODIMENTS

The specific structure and assembling method of the adapter and the nozzle structure proposed by the present invention will be described below with reference to the attached drawings. In each view, the same reference numbers denote the same components.

As mentioned before, according to the invention, the assembling between the adapter and the nozzle structure is achieved by a new connecting means, which will be described in details below.

Figure 1:
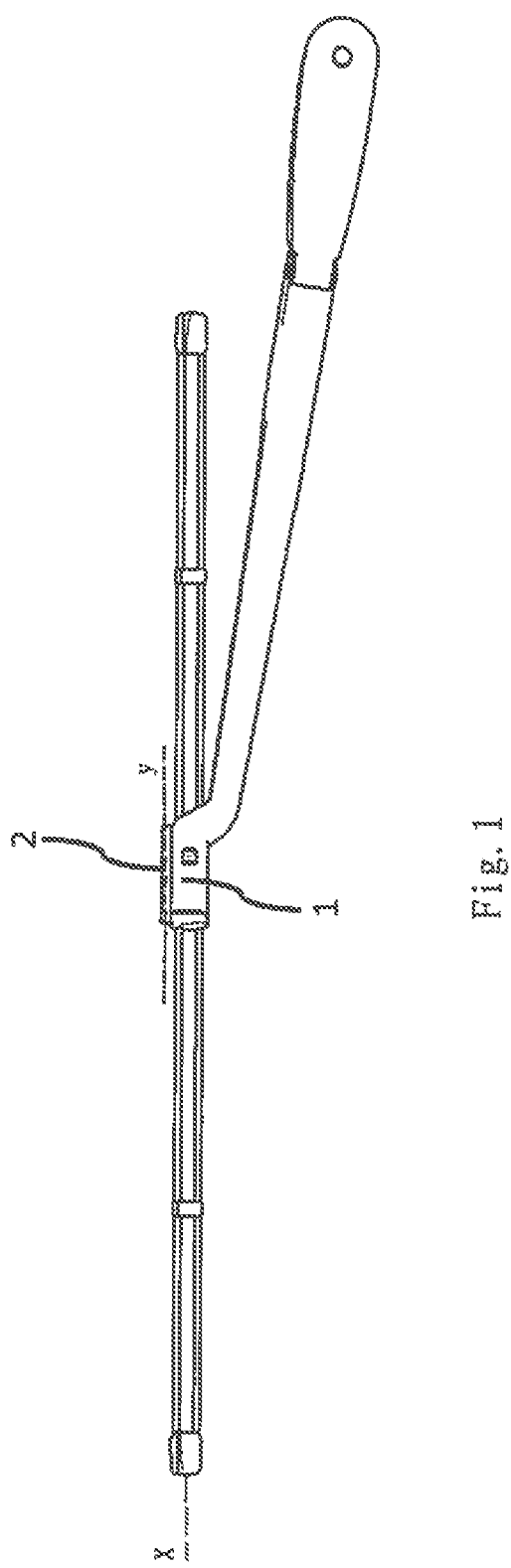
FIG. 1 is a schematic view of a wiper arm assembled with an adapter and a nozzle structure.
Figure 2:
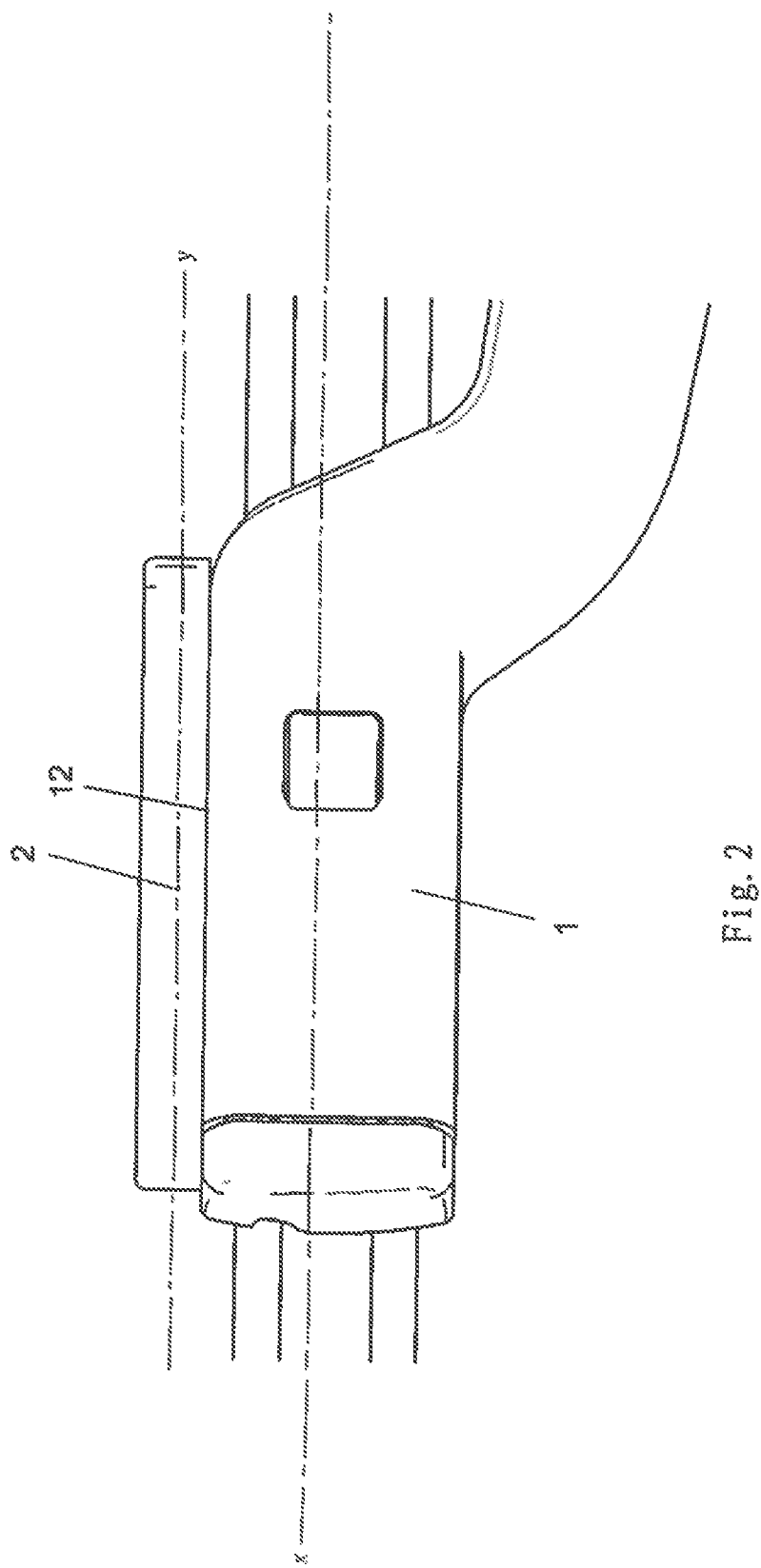
FIG. 2 is an enlarged view of the adapter and the nozzle structure shown in FIG. 1.
Figure 3:
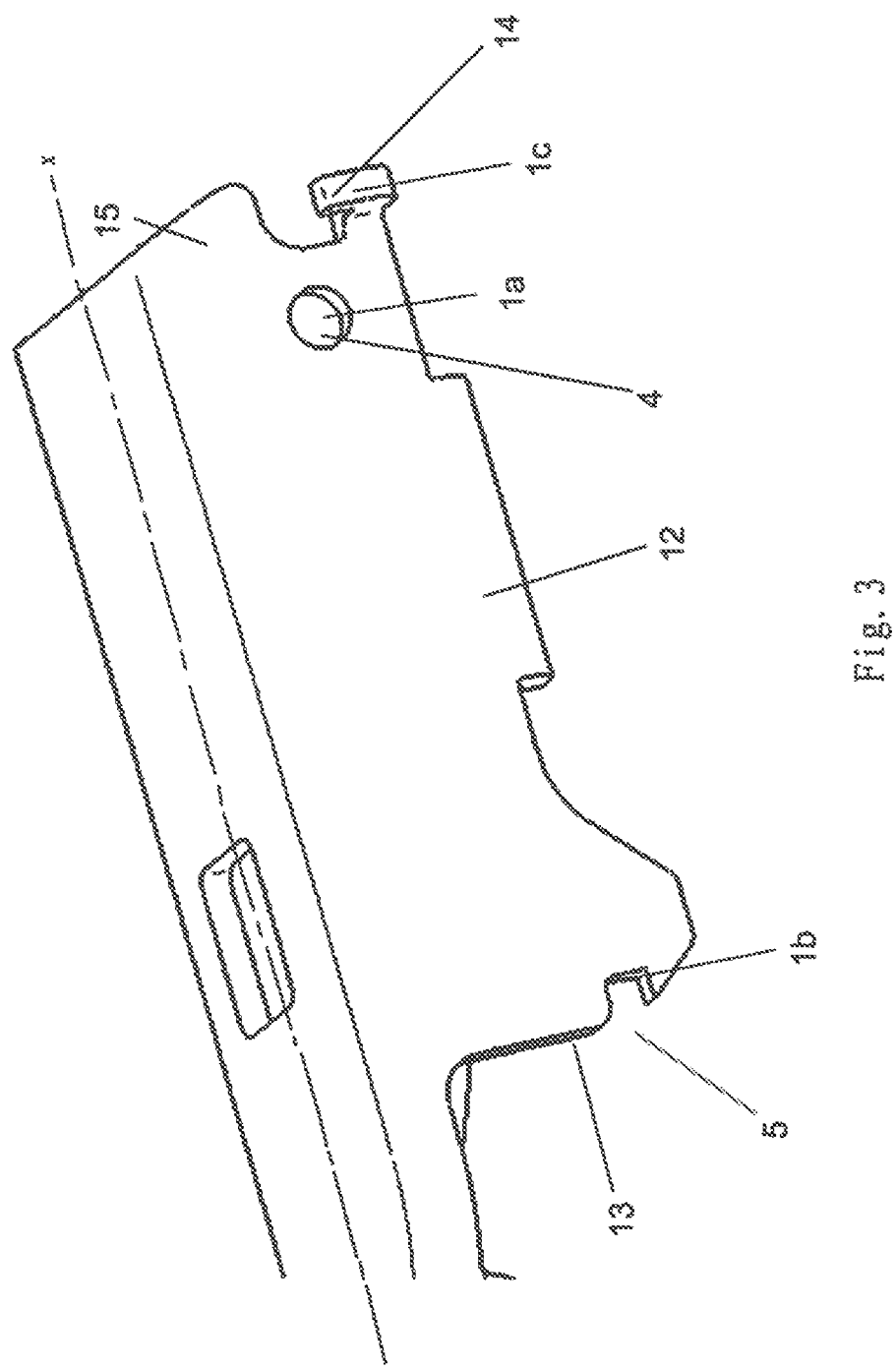
FIG. 3 is a schematic view of the adapter.
Figure 4:
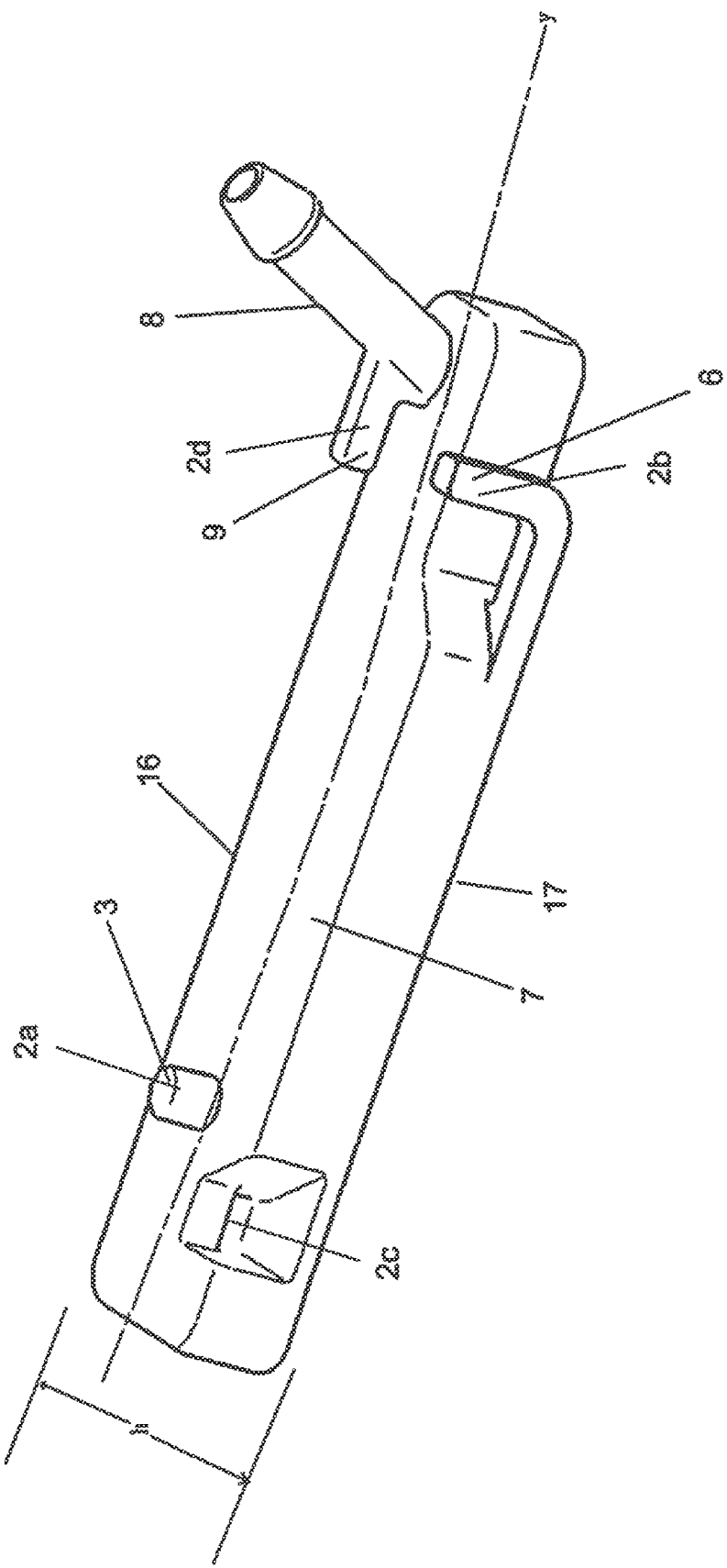
FIG. 4 is a schematic view of the nozzle structure.
Figure 6:
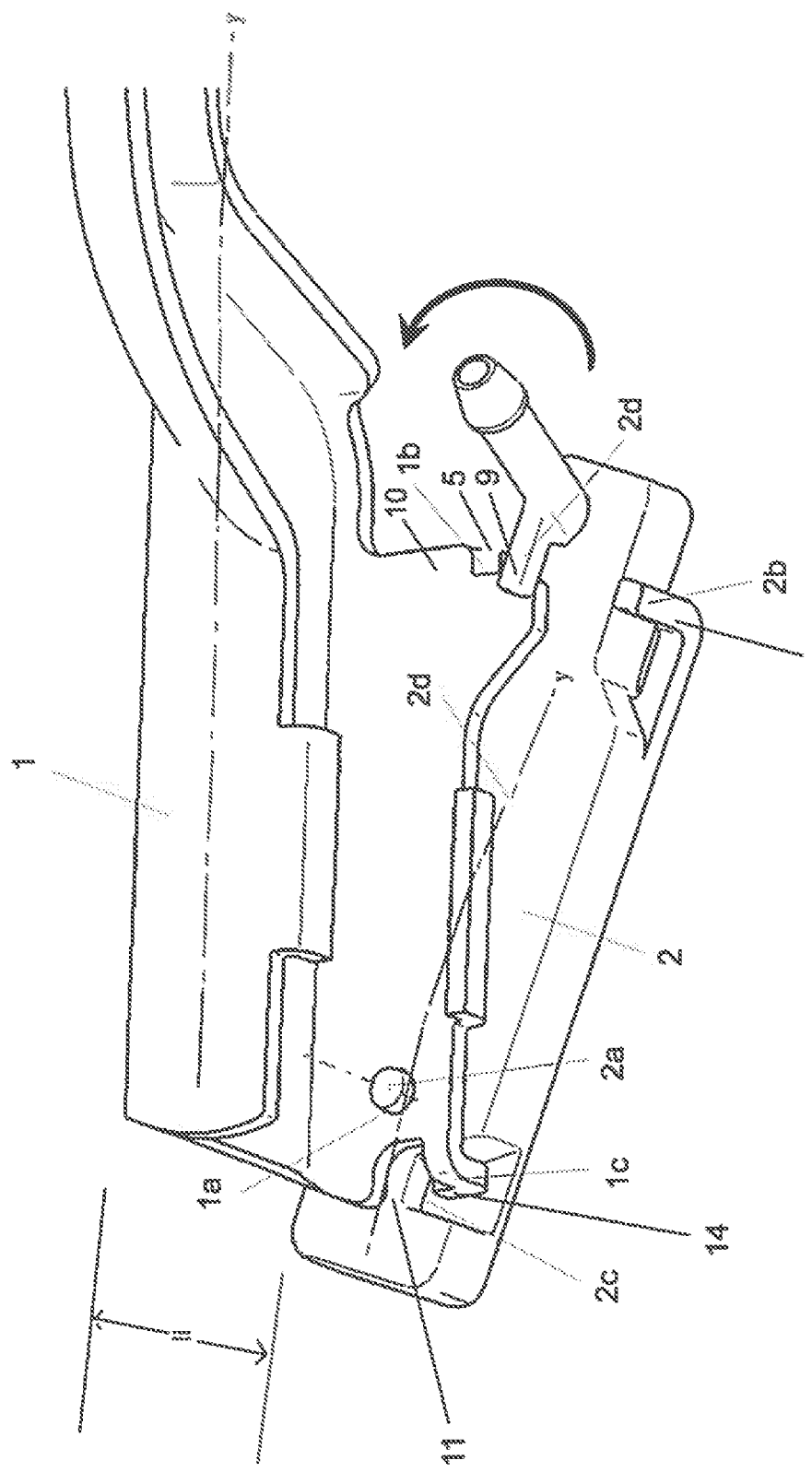
Figure 7:
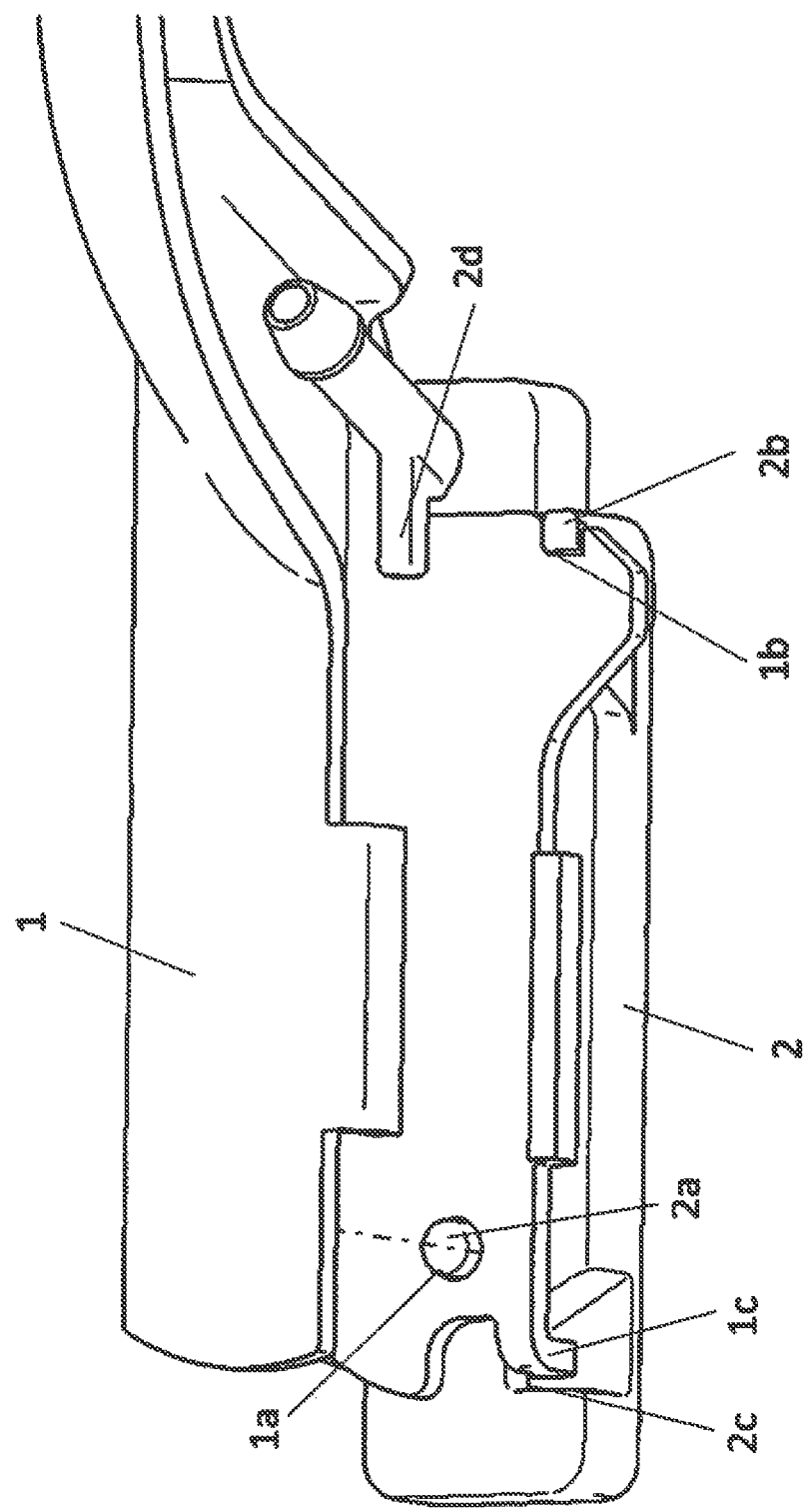
Figure 8:
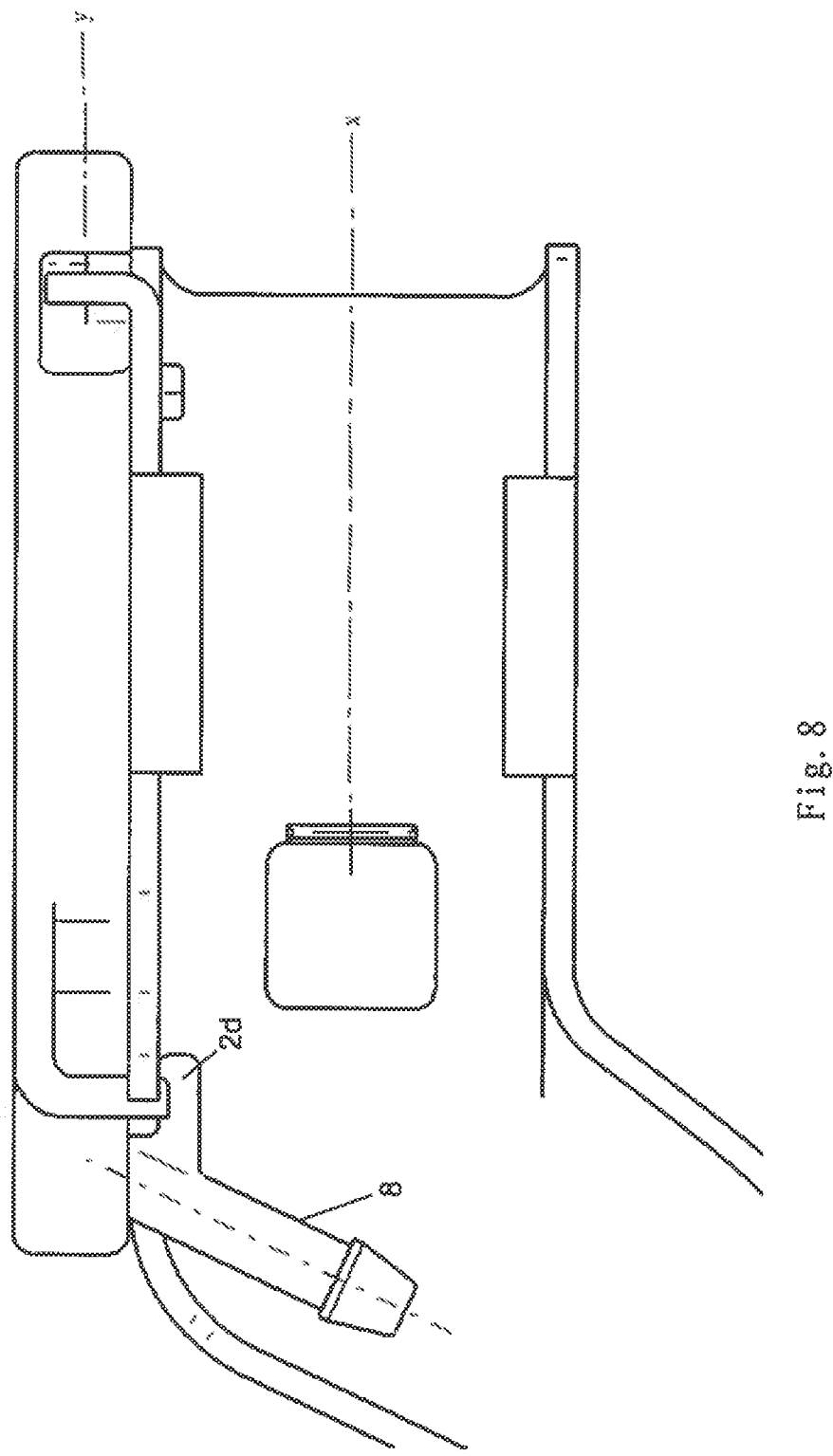
FIG. 8 is a plan view of the assembled adapter and the nozzle structure according to the first embodiment.

FIG. 2 is the enlarged view of the adapter 1 and the nozzle structure 2 shown in FIG. 1, in which, the nozzle structure 2 is secured to a side wall 12 of the adapter 1. In particular, the nozzle structure 2 is secured to the outer surface of the side wall 12 of the adapter from the outside of the adapter. FIGS. 3 and 6 show more clearly the adapter 1 and its side wall 12, in which, axis X denotes the longitudinal axis of the adapter 1, and in a cross-section perpendicular to the longitudinal axis X, the adapter 1 may be substantially U-shaped (shown in FIG. 6,7), the side wall 13 being one of the branches of the U-shaped structure.

The adapter 1 presents a first adapter assemble feature 1a and a second adapter assemble feature 1b. The nozzle structure 2 presents a body 7, a nozzle 8 extending from the body and a first nozzle structure assemble feature 2a as well as a second nozzle structure assemble feature 2b. The first nozzle structure assemble feature 2a and the second nozzle structure assemble feature 2b are used to cooperate with the first adapter assemble feature 1a and the second adapter assemble feature 1b respectively. Here, the first adapter assemble feature 1a and the first nozzle structure assemble feature 2a with each other to form a first connection in the form of pin-circular aperture between the adapter 1 and the nozzle structure 2, and the nozzle structure 2 and the adapter 1 are rotatably assembled together when they are connected only by means of the first connection, such that they play a pre-assembling role. Thus, the first connection is also referred as pre-assemble connection. After the nozzle structure and the adapter are pre-assembled together, the second adapter assemble feature 1b and the second nozzle structure assemble feature 2b are matched together by rotating the nozzle structure 2, so as to form a second connection in the form of snap fit between the adapter 1 and the nozzle structure 2. In this way, the nozzle structure 2 is secured easily to the adapter 1 by means of the first connection and the second connection.

The body 7 of the nozzle structure 2 may be a substantially plate structure, and its surface that faces the side wall 12 of the adapter is substantially a rectangle. When the nozzle structure 2 is assembled with the adapter 1, the longitudinal axis Y of the body 7 of the nozzle structure 2 is parallel to the longitudinal axis X of the adapter, namely, the length direction of the body 7 is consistent with that of the adapter 1.

Figure 9:
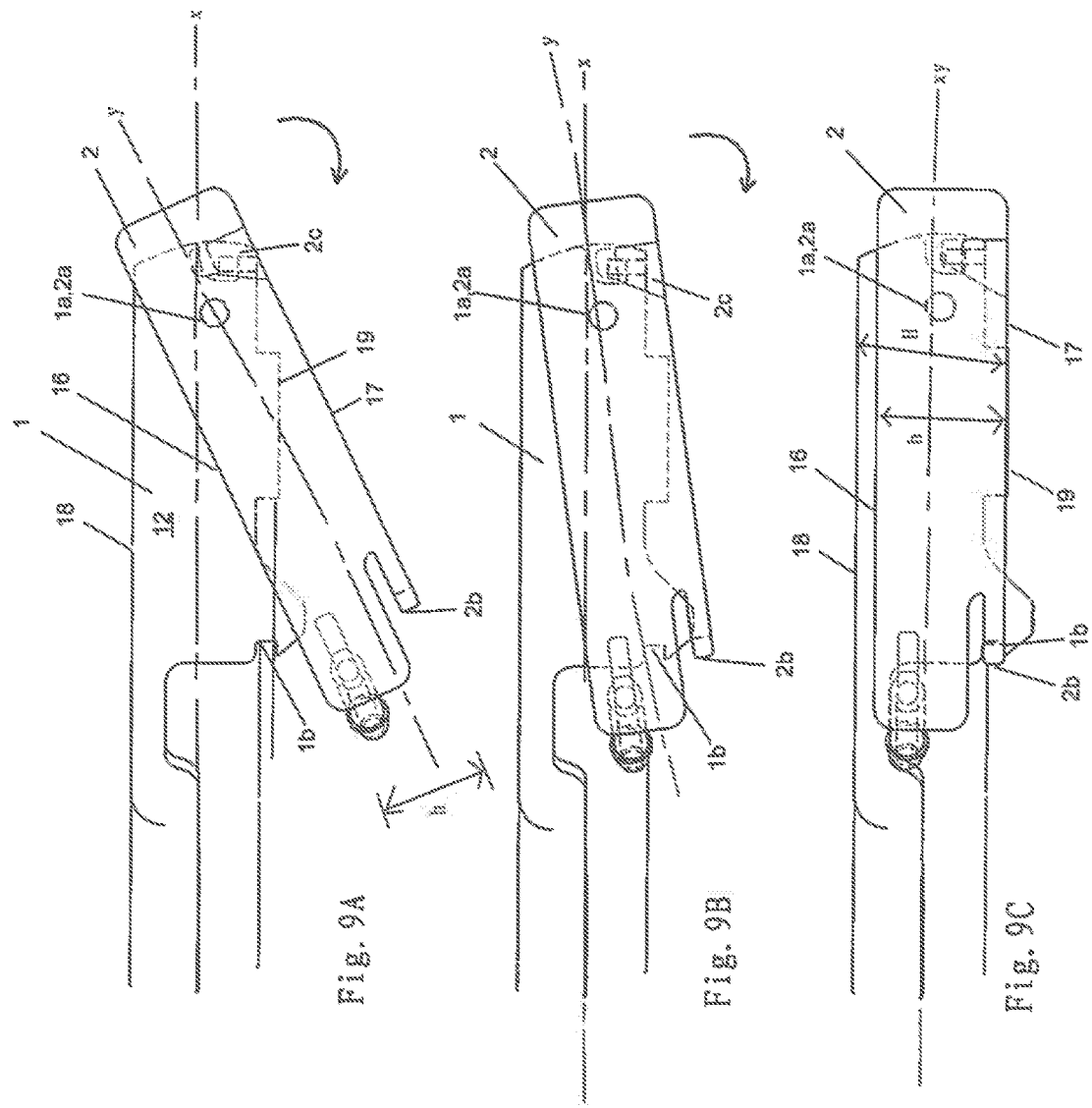
FIGS. 9A-C are the schematic views showing the assembling steps of the nozzle structure and the adapter.

Preferably, the width h of the body 7 of the nozzle structure is less than or equal to the width H of the said side wall 12 of the adapter 1, e.g., as seen in FIGS. 9A-C. When the nozzle structure 2 is mounted to the side wall 12 of the adapter 1, the top edge 16 of the body 7 of the nozzle structure does not protrude from the top edge 18 of the side wall 12 of the adapter, in other words, the top edge 16 of the said body 7 is not higher than the top edge 18 of the said side wall 12. Meanwhile, the bottom edge 17 of the body 7 of the nozzle structure does not protrude from the bottom edge 19 of the side wall 12 of the adapter, namely the bottom edge 17 of the body 7 of the nozzle structure does not exceed the bottom edge 19 of the side wall 12. Although the FIG. 19C shows that the top edge 16 of the body 7 is lower that the top edge 18 of the side wall 12, it's possible to set this top edge 16 to be flush with the top edge 18. With the configuration described above, the assembly consisting of the nozzle structure and the adapter is formed to have a simple and beautiful appearance and save space.

Besides, the adapter 1 further comprises a bending structure 1c extending from the side wall 12 and having an extension 14 substantially parallel to the side wall 12 of the adapter. Correspondingly, the nozzle structure 2 may have a stopping slot 2c engaging said bending structure 1c. When the nozzle structure 2 and the adapter 1 are assembled together, a portion of the bending structure 1c is engaged within the stopping slot 2c, and a portion 11 of the nozzle structure is sandwiched between the extension 14 of the said bending structure 1c and the said side wall 12 of the adapter.

With the features described above, the adapter 1 and the nozzle structure 2 can be easily assembled and disassembled. Specifically, the assembling method for assembling the nozzle structure to the adapter 1 including the following steps:

Step 1: fit the first adapter assemble feature 1a and the first nozzle structure assemble feature 2a together to form a first connection, or the so-called pre-assemble connection, in the form of pin-circular aperture, such that the nozzle structure 2 and the adapter 1 are rotatably pre-assembled together.

Step 2: rotate the nozzle structure 2 with respect to the adapter 1. Here, during Step 2, by means of the rotation, the portion 11 of the nozzle structure enters at its convenience into the space between the extension 14 of the bending structure 1c of said adapter and the side wall 12 of the adapter and thus a portion of the bending structure 1c is engaged within the stopping slot 2c.

Step 3: Continue rotating the nozzle structure 2 until that the second adapter assemble feature 1b and the second nozzle structure assemble feature 2b form a second connection in the form of snap fit.

With the above steps, the adapter 1 and the nozzle structure 2 are fixed together by means of the first and second connection, which is easy to operate without additional tools.

The nozzle structure assembled to the adapter in the above mentioned method could be easily disassembled, by unlocking the second connection in the form of snap fit between the second adapter assemble feature 1b and the second nozzle structure assemble feature 2b, and then rotating the nozzle structure 2 in an opposite direction.

FIGS. 3-9 show a first embodiment according to the invention, which will be described in details below.

Referring to FIGS. 3-8, the specific structures of the adapter 1 and the nozzle structure 2 as well as the correspondence between the two are shown. In general, the adapter 1 proposed by the present invention presents a first adapter assembling feature 1a and a second adapter assembling feature 1b that are used for connecting and securing the nozzle structure 1, and the nozzle structure 2 presents a body 7, a nozzle 8 extending from the body and a first nozzle structure assembling feature 2a as well as a second nozzle structure assembling feature 2b. The first nozzle structure assembling feature 2a and the second nozzle structure assembling feature 2b mentioned above are respectively used to be matched with the first adapter assembling feature 1a and the second adapter assembling feature 1b. Here, the first adapter assembling feature 1a and the first nozzle structure assembling feature 2a are matched with each other to form a first connection in the form of pin-circular aperture between the adapter 1 and the nozzle structure 2, and the nozzle structure 2 and the adapter 1 are rotatably assembled together when they are connected only by means of the first connection so as to play a pre-assembling role. The second adapter assembling feature 1b and the second nozzle structure assembling feature 2b are matched with each other to form a second connection in the form of snap fit between the adapter 1 and the nozzle structure 2. The nozzle structure 2 is secured to the adapter 1 by means of the first connection and the second connection.

Figure 5:
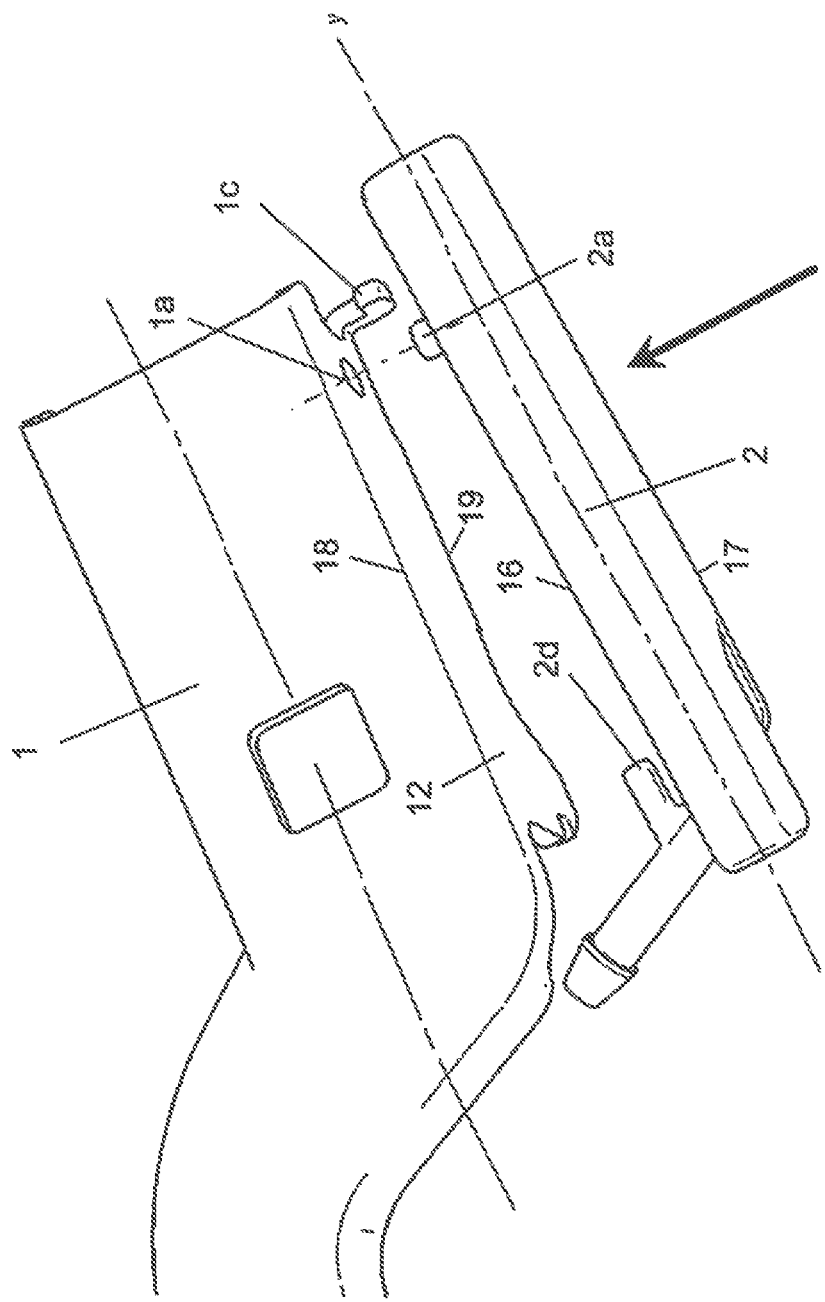
FIGS. 5-7 are schematic views of the adapter and the nozzle structure according to the first embodiment, showing the corresponding assembling features of the adapter and the nozzle structure from different perspectives.

In the first embodiment shown in the drawings, the first adapter assembling feature 1a is a circular aperture 4, correspondingly, the first nozzle structure assembling feature is a location pin 3 suitable for being inserted into said circular aperture 4, the circular aperture 4 having a diameter slightly larger than that of the location pin 3 so as to enable the location pin to rotate freely in the circular aperture when inserted thereinto. Preferably, the position of the circular aperture 4 may be close to a longitudinal end of the adapter 1. As shown in FIG. 5, when assembling the adapter 1 and the nozzle structure 2, we firstly insert said location pin 3 into said circular aperture 4 along the direction of the arrow in the figure to form a first connection in the form of pin-circular aperture, such that the nozzle structure 2 and the adapter 1 are rotatably pre-assembled together. Although the attached drawings only show an embodiment in which the first adapter assembling feature 1a is a circular aperture 4 and the first nozzle structure assembling feature is a location pin 3, we can also design the first adapter assembling feature 1a to be a location pin while the first nozzle structure assembling feature 2a to be a circular aperture.

In the first embodiment, as shown in the figure, the second adapter assembling feature 1b is a clipping slot formed at an edge 13, correspondingly, the second nozzle structure assembling feature is a clipping protrusion 6. As shown in the figure, the clipping protrusion 6 may be a substantially L-shaped elongated arm extending from the body 7 of the nozzle structure 2, however, the clipping protrusion 6 is not limited to a such form as long as it can be engaged with the clipping slot 5 to form a connection in the form of snap fit. In this way, when said location pin 3 is inserted in to said circular aperture 4 to form a first connection in the form of pin-circular aperture, the clipping protrusion 6 can be engaged with the clipping slot 5 via the nozzle structure 2 rotating with respect to the adapter 1.

Preferably, said clipping protrusion 6 is to be made integrally of plastic material with the body 7 of the nozzle structure, and due to its elongated structural form or the property of its material itself, said clipping protrusion 6 presents a certain degree of flexibility, allowing for the deformation before engaged within the clipping slot 5. Although the attached drawings only show an embodiment in which the second adapter assembling feature 1b is a clipping slot 5 and the second nozzle structure assembling 2b is a clipping protrusion 6, the persons having ordinary skill in the art can also carry out a simple structural modification to design the second adapter assembling feature to be a clipping protrusion while the second nozzle structure assembling feature to be a clipping slot.

In the first embodiment, the nozzle structure 2 further comprises a stopping block 2d, at least a portion 9 of which is parallel to the body 7, such that a portion 10 of the side wall 12 of the adapter 1 is sandwiched between the stopping block 2d and the body 7 of the nozzle structure 2 to prevent the movement of the nozzle structure 2 away from the adapter 1 when the nozzle structure and the adapter are assembled together, FIGS. 5-8 show the positional relationship between the stopping block 2d and the side wall 12. Said stopping block 2d can extend from the body 7 or the nozzle 8 of the nozzle structure, such that a portion 10 of the side wall 12 of the adapter enters into the space between a portion 9 of the stopping block 2d and the body 7 of the nozzle structure when said location pin 3 is inserted into the side circular aperture 4 and the nozzle structure 2 is rotated around the location pin 3.

Besides, the adapter 1 illustrated further comprises a bending structure 1c extending from the side wall 12 and having and extension 14 substantially parallel to the side wall 12 of the adapter. As shown in FIGS. 3, 5-7, the bending structure 1c preferably extends outwards from the vicinity of a corner of the side wall 12. Correspondingly, the nozzle structure 2 may have a stopping slot 2c engaging said bending structure 1c. The stopping slot 2c can be formed at a bottom edge 17 of the nozzle structure 2. When the nozzle structure 2 and the adapter 1 are assembled together, a portion of the bending structure 1c is engaged within the stopping slot 2c and a portion 11 of the nozzle structure is sandwiched between the extension 14 of the said bending structure 1c and the said side wall 12 of the adapter.

As shown in FIGS. 4-7, the body 7 of the nozzle structure 2 may be a substantially elongated plate in shape, and its surface opposite to the side wall 12 of the adapter is substantially a rectangle. When the nozzle structure 2 is assembled with the adapter 1, the longitudinal axis Y of the body 7 of the nozzle structure 2 is parallel to the longitudinal axis X of the adapter, namely, the length direction of the body 7 is consistent with that of the adapter 1. Preferably, as shown in FIGS. 9A-C, the width h of the body 7 of the nozzle structure is less than or equal to the width H of the said side wall 12 of the adapter 1. When the nozzle structure 2 is mounted to the side wall 12 of the adapter 1, the top edge 16 of the body 7 of the nozzle structure does not protrude from the top edge 18 of the side wall 12 of the adapter, in other words, the top edge 16 of the said body 17 is not higher than the top edge 18 of the said side wall 12. Meanwhile, the bottom edge 17 of the body 7 of the nozzle structure does not protrude from the bottom edge 19 of the side wall 12 of the adapter, namely the bottom edge 176 of the body 7 of the nozzle structure does not exceed the bottom edge 19 of the side wall 12. Although the attached drawings show that the top edge 16 of the body 7 is lower that the bottom edge 18 of the side wall 12, we can also set this top edge 16 to be flush with the top edge 18. With the configuration described above, the assembly consisting of the nozzle structure and the adapter is formed to have a simple and beautiful appearance and save space.

With the features described above, the adapter 1 and the nozzle structure 2 can be easily assembled and disassembled. FIG. 9A-C shows schematically the assembling method for assembling the adapter 1 and the nozzle structure 2 of the configuration in the first embodiment together. Specifically, the assembling method for assembling the nozzle structure to the adapter 1 including the following steps:

Step 1: fit the first adapter assembling feature 1a and the first nozzle structure assembling feature 2a together to form a first connection in the form of pin-circular aperture, such that the nozzle structure 2 and the adapter 1 are rotatably pre-assembled together. In the specific embodiment shown in the attached drawings, the first adapter assembling feature 1a is a circular aperture 4, while the first nozzle structure assembling feature is a location pin 3, therefore, this step can be specified as to insert said location pin 3 into said circular aperture 4 to form a first connection in the form of pin-circular aperture, such that the nozzle structure 2 and the adapter 1 are rotatably pre-assembled together.

Step 2: rotate the nozzle structure 2 with respect to the adapter 1. In the embodiment shown in the attached drawings, this step is specified as to rotate said nozzle structure 2 with respect to the adapter 1 taking the location pin 3 as the pivotal axis.

Here, during Step 2, through rotation, a portion 11 of the nozzle structure enters at its convenience into the space between the extension 14 of the bending structure 1c of said adapter and the side wall 12 of the adapter and a portion of the bending structure 1c is engaged within the stopping slot 2c. Furthermore, during Step 2, through rotation, a portion 10 of the side wall 12 of the adapter enters at its convenience into the space between a portion 9 of the stopping block 2d and the body 7 of the nozzle structure 2. The bending structure 1c and the stopping block 2d can both restrain the movement of the nozzle structure 2 away from the adapter.

Step 3: Continue rotating the nozzle structure 2 until that the second adapter assembling feature 1b and the second nozzle structure assembling feature 2b form a second connection in the form of snap fit.

In the first embodiment shown in the attached drawings, the second adapter assembling feature 1b is a clipping slot 5, while the second nozzle structure assembling feature 2b is a clipping protrusion 6, therefore this step is specified as to continue rotating the nozzle structure 2 when the clipping slot 5 is adjacent to the clipping protrusion, until that the clipping protrusion is engaged with the clipping slot to form a second connection in the form of snap fit.

With the method described above, the adapter 1 and the nozzle structure 1 can be easily assembled together without the need for additional tools. Furthermore, the nozzle structure assembled to the adapter with this connection method can be easily disassemble, merely requiring unlocking the second connection formed in the form of snap fit by the second adapter assembling feature 1b and the second nozzle structure assembling feature 2b and relieving the stopping effect of the stopping block 2d and the bending structure 1c. Specifically, the operator can firstly pull the clipping protrusion outwards to separate it from the engagement with the clipping slot 5. Subsequently, correspondingly rotate the nozzle structure 2, during which the bending structure 1c will get away from the stopping slot 2c and the stopping block 2d will relieve the restraint on the side wall 12. Finally, the nozzle structure 2 can be removed from the adapter 1.

FIGS. 10-17 show the second embodiment of the invention, which will be described in details below.

Figure 15:
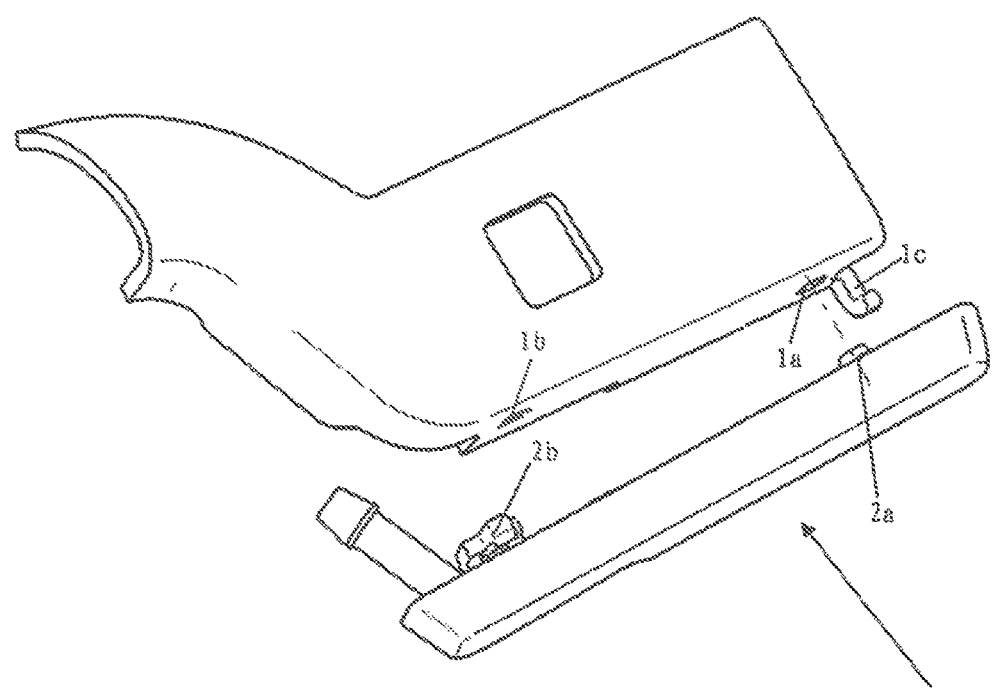
FIGS. 15-17 are schematic views of the adapter and the nozzle structure according to the second embodiment, showing the corresponding assemble features of the adapter and the nozzle structure from different perspectives.

Similar with the first embodiment, in the second embodiment, the first adapter assemble feature 1a is a circular aperture 4, and correspondingly, the first nozzle structure assemble feature is a location pin 3 suitable for being inserted into said circular aperture 4, the circular aperture 4 may have a diameter slightly larger than that of the location pin 3 so as to enable the location pin to rotate freely in the circular aperture when inserted thereinto. Preferably, the location of the circular aperture 4 is close to one of the longitudinal ends of the adapter 1. As shown in FIG. 15, when assembling the adapter 1 and the nozzle structure 2, said location pin 3 is firstly inserted into said circular aperture 4 along the direction of the arrow in the figure to form the first connection in the form of pin-circular aperture, such that the nozzle structure 2 and the adapter 1 are rotatably pre-assembled together.

Different with the first embodiment, in the second embodiment, the second adapter assemble feature 1b is a clipping slot 25 formed in the side wall 12 of the adapter, and the second nozzle structure assemble feature is a clipping protrusion 26.

Figure 14:
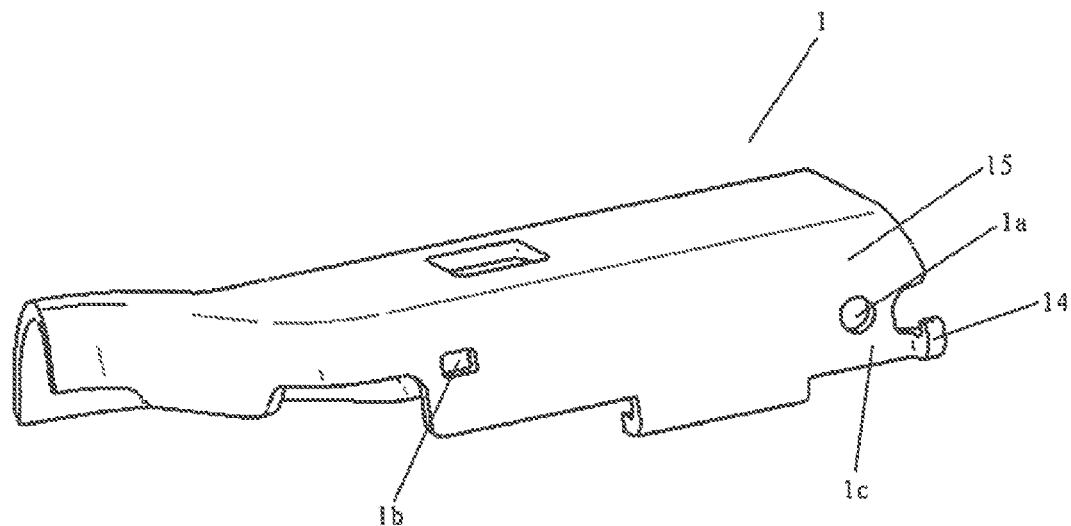
FIG. 14 is a schematic view of the nozzle structure according to the second embodiment.

As shown in FIGS. 14-15, the clipping slot 25 is a substantially square through-hole formed in the side wall 12 of the adapter, being spaced with the first adapter assemble feature 1a along the longitudinal direction of the adapter.

Figure 10:
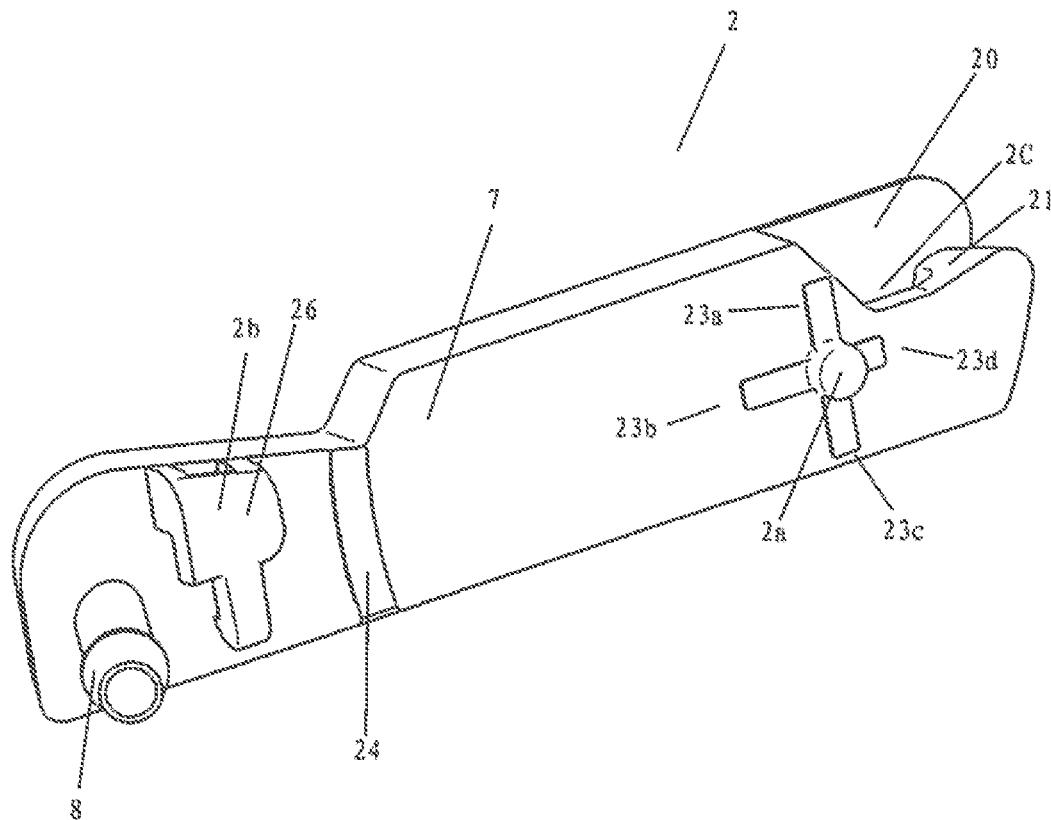
FIGS. 10-12 are schematic views showing the nozzle structure according to the second embodiment from different perspectives.
Figure 11:
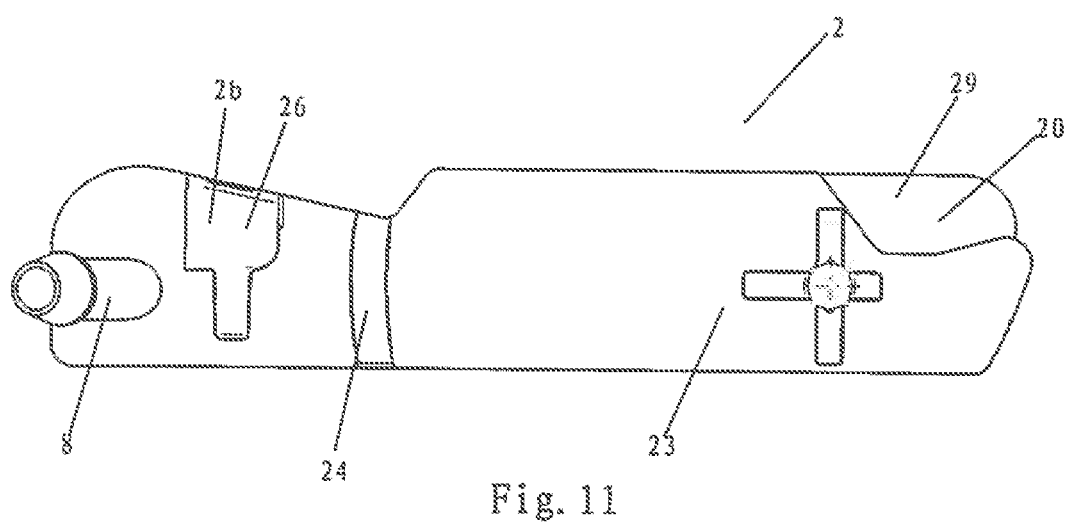

As shown in FIGS. 10-11, the clipping protrusion 26 is formed on the body 7 of the nozzle structure. The clipping protrusion 26 comprises a base 27, a body 28 extending from the base 27, and a hook 22 at the distal end of the body 28. The body may be of a stepped shape, with the width being larger near the base and being smaller near the hook 22. However, the body 28 may be of other form. The base is connected with the body 7 of the nozzle structure, and the body 28 is parallel with and spaced apart from the body 7, and the hook 22 is intended to snap into the clipping slot 25 of the adapter 1.

Figure 16:
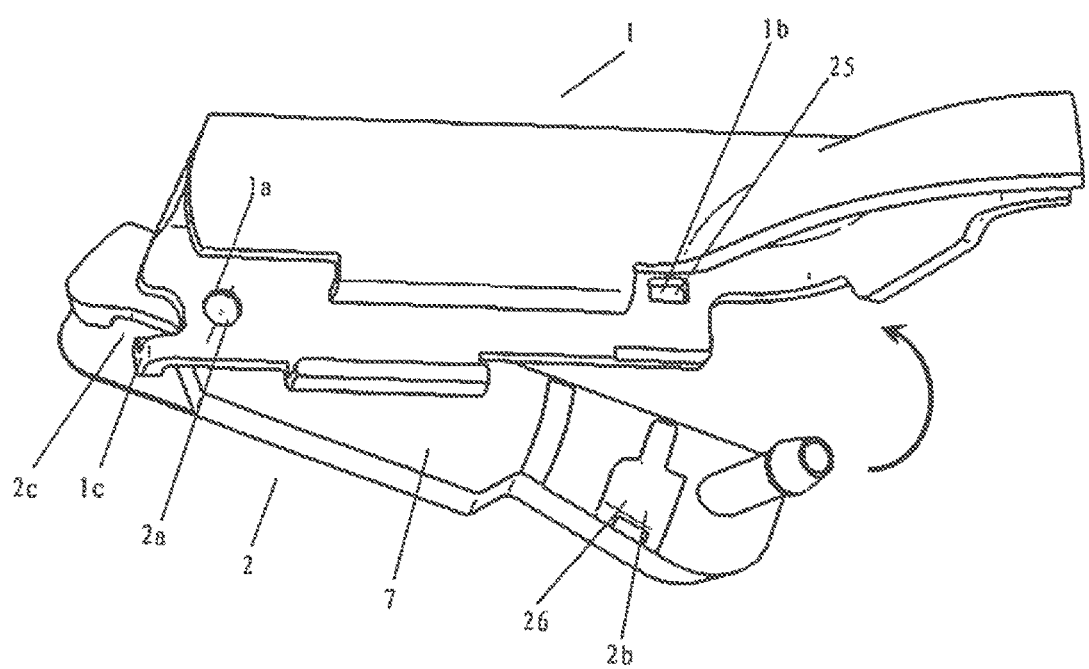
Figure 17:
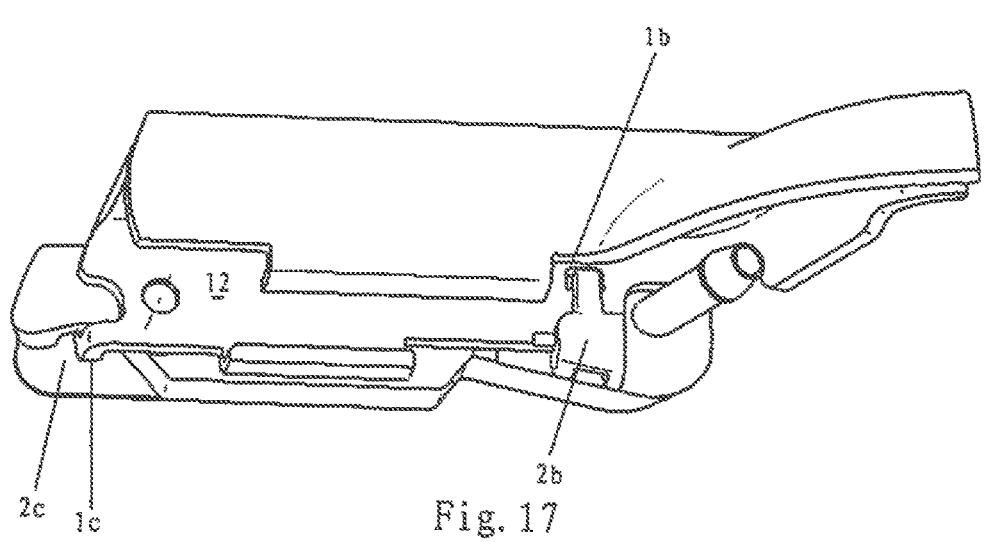

As shown in FIGS. 16-17, when the clipping protrusion 26 engages with the clipping slot 25, a portion of the side wall 12 of the adapter 1 is sandwiched between the body 7 of the nozzle structure and the body 28 of the clipping protrusion 26.

preferably, the clipping protrusion 26 is formed of plastic material integrally with the body 7 of the nozzle structure and due to its elongated structural form or the property of its material itself, said clipping protrusion 26 presents a certain degree of flexibility, allowing for its deformation before engaged within the clipping slot 25.

In the second embodiment, similar with the first embodiment, the adapter 1 further comprises a bending structure 1c extending from the side wall 12 and having an extension 14 substantially parallel to the side wall 12 of the adapter. As shown in FIGS. 14-17, the bending structure 1c preferably extends from the vicinity of a corner of the side wall 12. Correspondingly, the nozzle structure 2 may have a stopping slot 2c engaging said bending structure 1c. When the nozzle structure 2 and the adapter 1 are assembled together, the portion 11 of the nozzle structure is sandwiched between the extension 14 of the said bending structure 1c and the said side wall 12 of the adapter, to prevent the movement of the nozzle structure away from the adapter, as well as to prevent the further rotation of the nozzle structure with respect to the adapter. In the second embodiment, as shown in FIGS. 10-11, a cut-out portion 20 is disposed at the end of the nozzle structure which is adjacent to the first nozzle structure assemble feature 2a. The presence of the cut-out portion 20 forms a thin-wall portion 29 at the end of the body 7 which is adjacent to the first nozzle structure assemble feature 2a. A stopping slot 2c is disposed at the cut-out portion 20 and is open at the cut-out surface 21 of the cut-out portion 20.

Figure 12:
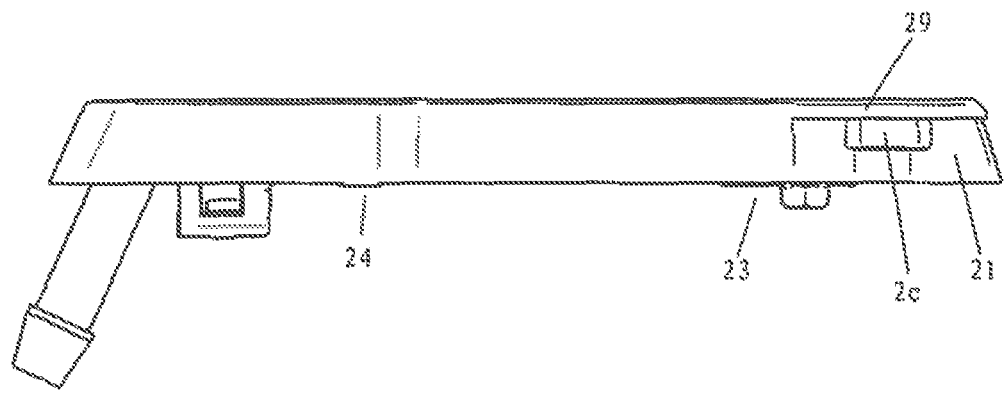
Figure 13:
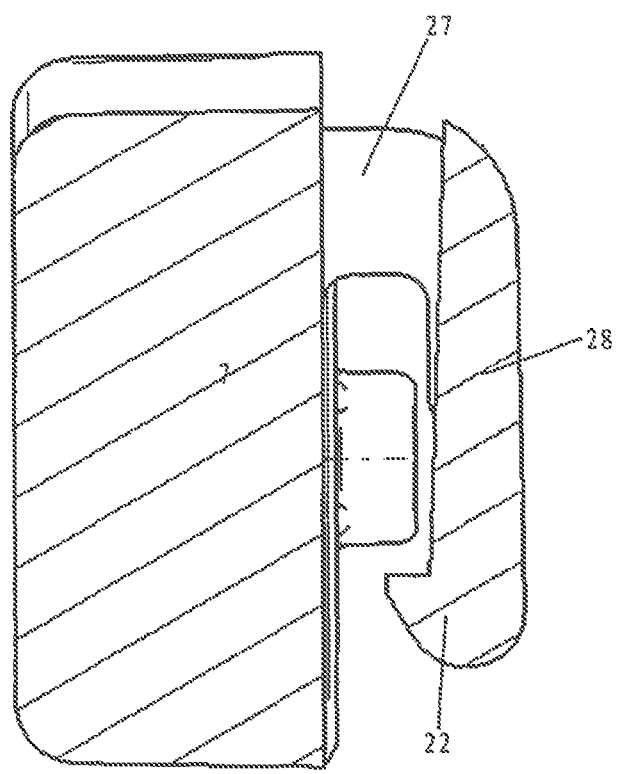
FIG. 13 is a schematic view of the adapter according to the second embodiment.

As shown in FIGS. 10-11, on the mounting surface of the nozzle structure 2 that faces the adapter 1, there are raised regions 23 adjacent to the location pin 3. The raised regions 23 are higher than the mounting surface so as to contact the side wall 12. In one form, the raised regions 23 may comprise four strip-shaped raised regions 23a, 23b, 23c, 23d that are disposed surrounding the location pin 3. However, the raised regions 23 could be of other forms. Further, there could be also a band-shaped raised region 24 which is higher than the mounting surface of the nozzle structure 2 and which is perpendicular to the longitudinal direction of the nozzle structure and is intended to contact with the side wall 12. The FIG. 12 shows clearly that the raised regions 23 and the band-shaped raised region 24 is higher than the mounting surface. During the rotation, nozzle structure 2 contacts the adapter 1 with its raised regions 23 and the band-shaped region 24. In this way, the contact area between the mounting surface of the nozzle structure and the outer surface of the side wall 12 is reduced, which brought the advantages that: on one hand, the surface abrasion and the friction during the rotation of the nozzle structure will be reduced and thus the operation feelings will be improved; on the other hand, as compared with the design with two larger contacting surface, such design allow better fit between the two contacting surface.

Under the configuration of the second embodiment, referring to FIGS. 15-17C, the nozzle structure 2 and the adapter 1 could be assembled together with the following steps.

Step 1: insert said location pin 3 into said circular aperture 4 to form a first connection in the form of pin-circular aperture, such that the nozzle structure 2 and the adapter 1 are rotatably pre-assembled together.

Step 2: rotate said nozzle structure 2 with respect to the adapter 1 taking the location pin 3 as the pivotal axis. Here, during Step 2, through the rotation, the portion 11 of the nozzle structure 2 enters at its convenience into the space between the extension 14 of the bending structure 1c of said adapter and the side wall 12 of the adapter, and a portion of the bending structure 1c is engaged within the stopping slot 2c. Meanwhile, a portion of the side wall 12 of the adapter enters into the space between the clipping protrusion 26 and the body 7.

Step 3: continue rotating the nozzle structure 2 until that the clipping protrusion 26 is snapped into the clipping slot 25 firmly, to form the second connection in the form of snap fit.

The nozzle structure assembled to the adapter in the above mentioned method could be easily disassembled. Specifically, the operator can firstly pull the clipping protrusion 26 outwards to separate its engagement with the clipping slot 25. Subsequently, correspondingly rotate the nozzle structure 2 in a direction opposite the direction for the assembling. When each of the first and second connections is disengaged, the nozzle structure 2 can be removed from the adapter 1. While the best modes for carrying out the present invention have been described in detail above with reference to the attached drawings, however, under the premise of not departing from the concept of the present invention, numerous variations can be made from the specific embodiment described above and the various technical features and structures proposed by the present invention can be combined variously without exceeding the scope of protection thereof.

REFERENCE SIGNS 1 adapter
1a first adapter assemble feature
1b second adapter assemble feature
1c bending structure
2 nozzle structure
2a first nozzle structure assemble feature
2b second nozzle structure assemble feature
2c stopping slot
3 location pin
4 circular aperture
5 clipping slot
6 clipping protrusion
7 body of the nozzle structure
8 nozzle
9 stopping portion
10 a portion of the side wall 12
11 a portion of the nozzle structure 2
12 side wall
13 edge
14 extension of the bending structure 1c
15 end
16 top edge of the body 7
17 bottom edge of the body 7
18 top edge of the side wall 12
19 bottom edge of the side wall 12
20 cut-out portion
21 cut-out surface
22 hook
23 raised regions
23a-23d strip-shaped raised regions
24 band-shaped raised region
25 clipping slot
26 clipping protrusion
27 base
28 body
29 thin-wall portion

The invention claimed is:

1. An assembly used in windscreen wipers, comprising:
an adapter used for connecting and securing a nozzle structure and comprising a first adapter assembling feature and a second adapter assembling feature,
the nozzle structure having a body, a nozzle extending from the body, a first nozzle structure assembling feature and a second nozzle structure assembling feature,
wherein the first adapter assembling feature and the first nozzle structure assembling feature are matched with each other to form a first connection in the form of pin and a circular aperture, between the adapter and the nozzle structure, and the nozzle structure and the adapter are rotatably pre-assembled together when they are connected only by the first connection,
wherein the second adapter assembling feature and the second nozzle structure assembling feature are matched with each other to form a second connection in the form of a snap fit between the adapter and the nozzle structure,
wherein the nozzle structure is secured to a side wall of the adapter by the first connection and the second connection,
wherein the first adapter assembling feature is one of a location pin and a circular aperture, while the first nozzle structure assembling feature is the other one of the location pin and the circular aperture and/or,
wherein the second adapter assembling feature is a clipping slot, the second nozzle structure assembling feature is a clipping protrusion, wherein the clipping protrusion is made integrally with the body of the nozzle structure.

2. The assembly of claim 1, wherein the body of the nozzle structure is substantially rectangular in shape, with its longitudinal axis consistent with a longitudinal axis of the adapter, and with its width less than or equal to the width of the side wall of the adapter.

3. The assembly of claim 1, wherein a bottom edge of the body of the nozzle structure does not protrude from a bottom edge of the side wall of the adapter when the nozzle structure and the adapter are assembled.

4. An assembly used in windscreen wipers, comprising:
an adapter used for connecting and securing a nozzle structure and comprising a first adapter assembling feature and a second adapter assembling feature,
the nozzle structure having a body, a nozzle extending from the body, a first nozzle structure assembling feature and a second nozzle structure assembling feature,
wherein the first adapter assembling feature and the first nozzle structure assembling feature are matched with each other to form a first connection in the form of pin and a circular aperture, between the adapter and the nozzle structure, and the nozzle structure and the adapter are rotatably pre-assembled together when they are connected only by the first connection,
wherein the second adapter assembling feature and the second nozzle structure assembling feature are matched with each other to form a second connection in the form of a snap fit between the adapter and the nozzle structure, and
wherein the nozzle structure is secured to a side wall of the adapter by the first connection and the second connection, and
wherein the nozzle structure further comprises a stopping block extending from the body or the nozzle of the nozzle structure, and at least a portion of the stopping block is parallel with the body of the nozzle structure, such that a portion of the side wall of the adapter is sandwiched between the stopping block and the body of the nozzle structure when the nozzle structure and the adapter are assembled together.

5. An assembly used in windscreen wipers, comprising:
an adapter used for connecting and securing a nozzle structure and comprising a first adapter assembling feature and a second adapter assembling feature,
the nozzle structure having a body, a nozzle extending from the body, a first nozzle structure assembling feature and a second nozzle structure assembling feature,
wherein the first adapter assembling feature and the first nozzle structure assembling feature are matched with each other to form a first connection in the form of pin and a circular aperture, between the adapter and the nozzle structure, and the nozzle structure and the adapter are rotatably pre-assembled together when they are connected only by the first connection, wherein the second adapter assembling feature and the second nozzle structure assembling feature are matched with each other to form a second connection in the form of a snap fit between the adapter and the nozzle structure, and wherein the nozzle structure is secured to a side wall of the adapter by the first connection and the second connection, and wherein the adapter further comprises a bending structure having an extension which is substantially parallel with the side wall of the adapter, and the nozzle structure has a stopping slot engaging the bending structure, such that a portion of the nozzle structure is sandwiched between the extension of the bending structure and the side wall of the adapter when the nozzle structure and the adapter are assembled together.

* * * * *